(12) United States Patent
Schack

(10) Patent No.: US 6,394,222 B1
(45) Date of Patent: May 28, 2002

(54) ADJUSTABLE BRACE

(75) Inventor: Göran Schack, Yngsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/527,570

(22) Filed: Mar. 16, 2000

(30) Foreign Application Priority Data

Mar. 17, 1999 (SE) ............................................. 9901101

(51) Int. Cl.$^7$ .............................................. H04R 25/00
(52) U.S. Cl. .................................... 181/129; 381/381
(58) Field of Search ................................. 181/129, 130, 181/135, 133, 136; 381/381, 370, 374, 375, 330, 371, 376, 377, 379, 383; 24/20 R, 20 S, 16 R, 20 CW, 20 TT, 20 EE, 23 EE, 20 W

(56) References Cited

U.S. PATENT DOCUMENTS

| | | | | |
|---|---|---|---|---|
| 3,982,307 A | * | 9/1976 | Smith et al. | 24/20 R |
| 4,020,297 A | * | 4/1977 | Brodie | 381/381 |
| 4,183,120 A | * | 1/1980 | Thorne | 24/16 R |
| 4,529,058 A | * | 7/1985 | Emery | 181/129 |
| 4,783,822 A | * | 11/1988 | Toole et al. | 381/381 |
| 5,115,541 A | * | 5/1992 | Stichel | 24/20 R |
| 5,446,788 A | | 8/1995 | Lucey et al. | |
| 5,673,432 A | * | 10/1997 | Kitayama | 2/15 |
| 5,729,615 A | * | 3/1998 | Yang | 381/381 |
| 5,881,149 A | | 3/1999 | Weatherill | |
| 6,035,961 A | * | 3/2000 | Sun | 181/129 |
| 6,104,824 A | * | 8/2000 | Ito | 381/381 |

FOREIGN PATENT DOCUMENTS

| | | |
|---|---|---|
| DE | 38 31 207 | 4/1989 |
| DE | 198 10 582 | 9/1998 |
| EP | 0 158 391 | 10/1985 |
| WO | 97/27721 | 7/1997 |

* cited by examiner

Primary Examiner—Khanh Dang
(74) Attorney, Agent, or Firm—Burns, Doane, Swecker & Mathis, L.L.P.

(57) ABSTRACT

The invention relates to an adjustable brace (1) comprising a pair of resilient elements (2, 3) which are interconnected at the ends (4, 5). The resilient elements are curved so that one element (2) is predominantly positioned externally in the brace, while the other element (3) is predominantly positioned internally in the brace. Means (6) are provided to cooperate with both elements between their ends to adjust the distance between the elements. If the means are affected in a direction toward each other, e.g. halfway along the brace, tensile forces will be generated in the internal element and compressive forces in the external element and the resulting force will cause the brace to curve additionally. The field of use is preferably for braces which are to extent behind the ear to hold a loudspeaker, side bars of a pair of glasses, etc. which are to be adapted to an individual anatomy.

Figure 1:
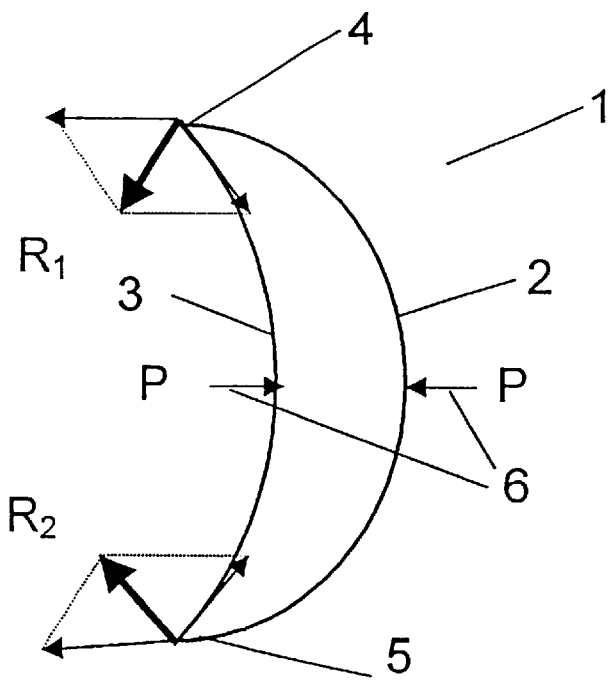
Figure 1:
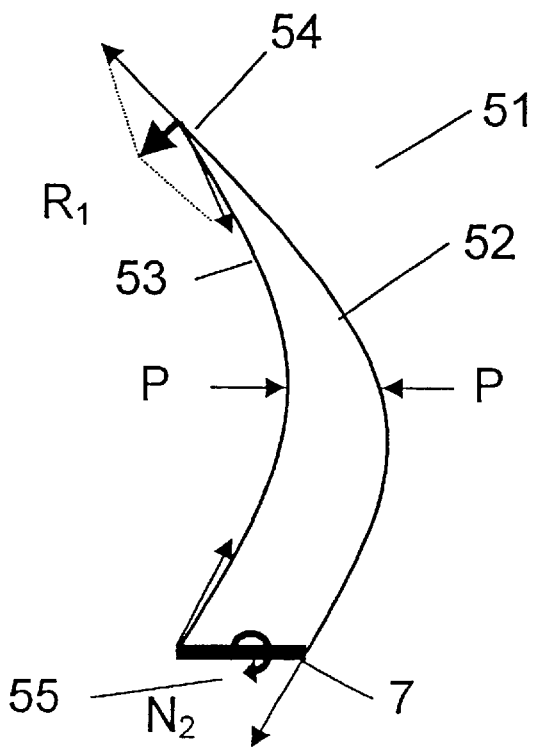

9 Claims, 4 Drawing Sheets a.　　　b.　　　c.　　　d.

ADJUSTABLE BRACE

The invention relates to an adjustable brace comprising a pair of resilient elements which are interconnected at the ends. The brace may be made of plastics, metal or a combination of such or corresponding materials, there being achieved a desired spring effect relative to the thickness of the material.

The field of use is preferably for braces which are to extent behind the ear to hold a loudspeaker, side bars of a pair of glasses, etc. which are to be adapted to an individual anatomy.

The problem of adjusting a side bar of a pair of glasses or an earpiece for a headset for ears of different sizes has been dealt with in prior art solutions in a variety of ways. For earpieces for headsets, one solution has been to have several differently sized 'models' to cover the spectrum of ear sizes. This solution has the drawback that it requires a variety of nearly identical parts to be delivered to each customer, none of which is guaranteed to fit exactly, which is an inadequate solution and an obvious waste of material. Another solution uses curved pieces that may be prolonged to embrace a larger part of the ear, maintaining the same radius of curvature. This has the drawback that it may not necessarily be possible to adjust the piece to an appropriate squeeze of the ear in question. Yet another solution uses deformable curved pieces, e.g. a metal wire embedded in a plastics material. This solution has the drawback of being susceptible to wear in that the metal wire may break, destroying its functionality and further not being easily adjusted to an appropriate squeeze of the ear.

The object of the invention is to provide a brace having adjustment means allowing the brace to curve more or less and to assume the shape which is optimum for a given individual. Other fields of use may also be relevant.

This object is achieved in that the elements of the brace are curved so that one element is predominantly positioned externally in the brace, while the other element is predominantly positioned internally in the brace, means being provided to cooperate with both elements between the ends thereof to adjust the distance between the elements.

Preferably, the elements are evenly curved, the external element generally having smaller radii of curvature than the internal element. In this situation it is easier to explain what is meant by the internal and external elements, as the external element will mainly define the convex contour of the brace, while the internal element will mainly define the concave contour of the brace. This mutual position of the elements means that if these are e.g. affected in a direction toward each other, e.g. halfway along the brace, then tensile forces will be generated in the internal element and compressive forces in the external element. When these forces are combined by the parallelogram of the forces at the ends of the brace, the resulting force will cause the brace to curve additionally.

The elements may converge toward one end of the brace and the greater the mutual angle formed by the elements, the greater the effective force of curvature will be. The elements may also diverge, and in this case they will be mutually rigidly connected via a transverse member, so that the moment generated by the tensile and compressive forces also contributes to curving the brace.

When the elements converge at one end of the brace and diverge at the other end of the brace, the distance between the elements will generally increase from one end to the other end of the brace, which is particularly expedient if the adjustment means are either a ring surrounding the elements, or a slide positioned between the elements for cooperation with these.

However, nothing prevents the use of a ring or a slide in connection with an element which converges at both ends, but the curvature effect will be greatest when the slide is in a central position and smallest in an arbitrary one of the outer positions. An adjusting screw may be used as an alternative.

The brace may be made of any suitable material. Important for the functionality of the brace is that a certain rigidity of the junctions between the longitudinal members is ensured and at the same time that a certain flexibility allowing the longitudinal members to be deformed in a direction normal to their longitudinal axis is incorporated. This may be achieved by an appropriate choice of materials in combination with the actual design of the device.

It is noted that the spring constant of the resilient elements need not be the same in the entire longitudinal direction of the element, but may vary so that the way in which the brace curves because of the adjustment means, may be adapted to the anatomic conditions. The brace may also be provided with more than one adjustment means, and these may be adapted for temporary fixing, so that a user may adjust his brace once for all so that it maintains its original shape.

A special embodiment of the invention implements the earpiece in acetal (POM). The advantages hereof, in addition to providing the relevant material properties such as stiffness and surface friction are, low weight, low cost, ease of manufacture in suitable forms and suitability for being adapted to the specific local shapes of the 'surroundings' of the ear, allowing identical pieces to be used on the left as well as the right side.

The invention will now be described more fully below with reference to the drawing, in which FIGS. 1($a,b$) show the forces governing the curvature of the brace according to the invention, FIGS. 2($a$–$d$) schematically show different examples of the shapes of the longitudinal members according to the invention, FIGS. 3($a$–$d$) show various means for applying transversal forces to the longitudinal members of the brace according to the invention, and FIGS. 4($a,b$) show an earpiece according to the invention.

Figure 2:
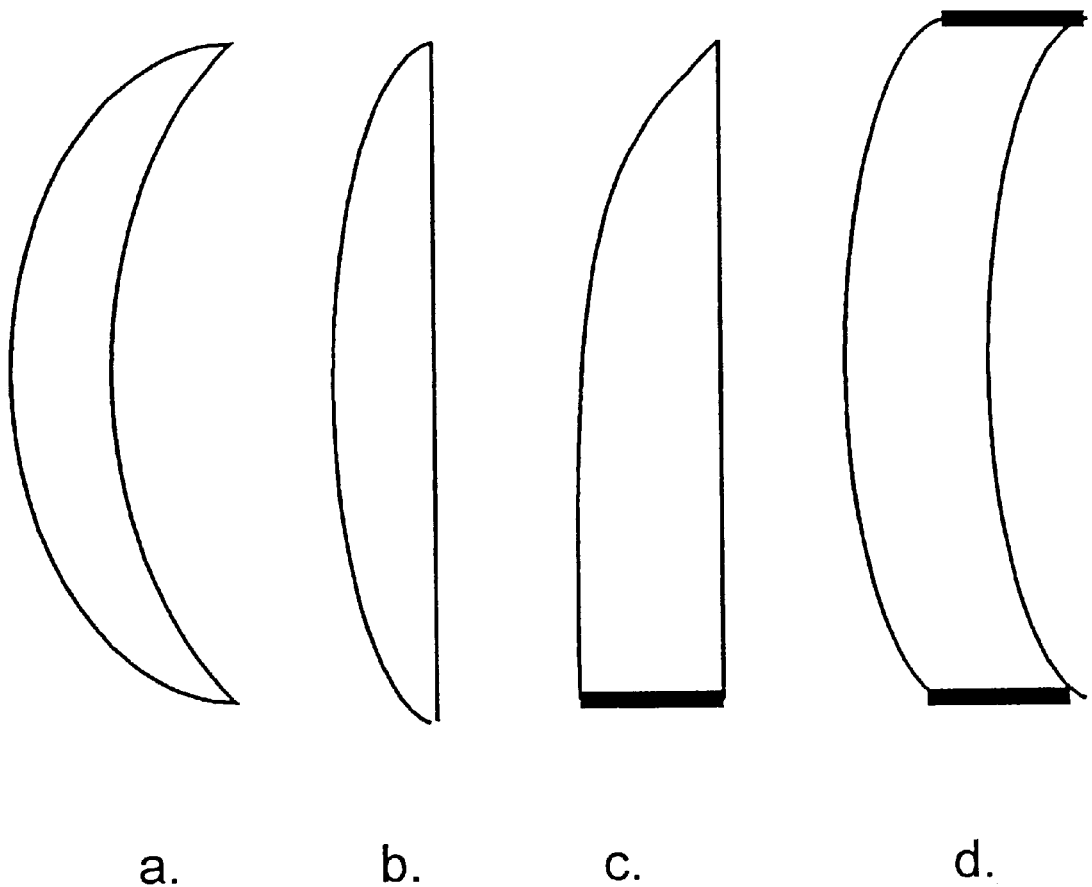

In FIG. 1$a$ the forces governing the curvature of a brace 1 as a result of the application of the forces P normal to the longitudinal members 2, 3 are sketched. The arrows 6 symbolize the forces P as well as the means for cooperating with the longitudinal members 2, 3. The brace 1 consists of two curved longitudinal members 2, 3 of different curvature intersecting each other at both ends 4, 5 of the brace. The longitudinal members are represented as a line only, i.e. their transversal dimensions are not indicated. The radius of curvature of the 'inner' longitudinal member 3 at the point of the applied transversal force is decreased, whereas the radius of curvature of the 'outer' longitudinal member 2 is increased. The forces at the ends due to the attempted stretching of the 'inner' member 3 and the attempted compression of the 'outer' member 2 are indicated together with their resultants $R_1$, $R_2$. The resultant forces $R_1$, $R_2$ will tend to increase the curvature of the brace 1, thus forcing the ends 4, 5 of the brace closer together.

Similarly, FIG. 1$b$ shows the forces in question on a brace 51, consisting of two curved longitudinal members 53, 53 of different curvature intersecting each other at one end 54 of the brace only and rigidly joined at the other end 55 a certain distance apart, as indicated by the bottom bold line 7. In this case the situation at the intersecting end 54 is similar to the one sketched in FIG. 1a. At the non-intersecting end 55, the two forces create a torque $N_2$ that, together with the resultant force $R_1$ at the other end 54 of the brace, tends to force the ends 54, 55 of the brace closer together.

It should be noted that the greater the mutual angle formed by the elements (i.e. by the tangents of the curves representing the elements at their intersection), the greater the effective force of curvature will be. This is reflected in FIGS. 1a and b in that the resultant force $R_1$ in FIG. 1a is greater than the resultant force $R_1$ in FIG. 1b.

In FIGS. 2a to d various examples of possible shapes of the longitudinal members of the brace are shown. The lines in bold at the ends symbolize the rigidity of the joint in question. Theoretically, the shapes where the two longitudinal members have a common point of intersection will function even without a rigid joint. In practice, however, due to the finite transversal dimensions of the longitudinal members, the joint will have a certain size and an appropriate rigidity of the joint is advantageous for the functionality. The longitudinal members are represented as a line or curve only, i.e. their transversal dimensions are not indicated. FIG. 2a represents an embodiment consisting of two circular longitudinal members having different radii of curvature. Similar embodiments consisting of curved, but non circular, longitudinal members (e.g. piecewise elliptic, hyperbolic, etc.) may be implemented. FIG. 2b represents an embodiment consisting of a curved and a linear longitudinal member. FIG. 2c represents an embodiment consisting of a curved and a linear longitudinal member, where, at one end, the two longitudinal members meet a certain distance apart (in opposition to the embodiments of FIGS. 2a and 2b, where the centre lines of the two longitudinal members intersect each other). Similar embodiments where both longitudinal members are curved may be implemented. FIG. 2d represents an embodiment consisting of two identically curved longitudinal members separated at both rigid ends by a certain distance. Similar embodiments where the distances separating the two longitudinal members and/or the curvature of the longitudinal members are different may also be implemented.

In the sketches of FIGS. 2a to d, it is assumed that the two longitudinal members have identical transversal dimensions and identical material properties. Embodiments where the two longitudinal members have different transversal dimensions or different elastic (and/or other) properties may, however, also be implemented.

Figure 3:
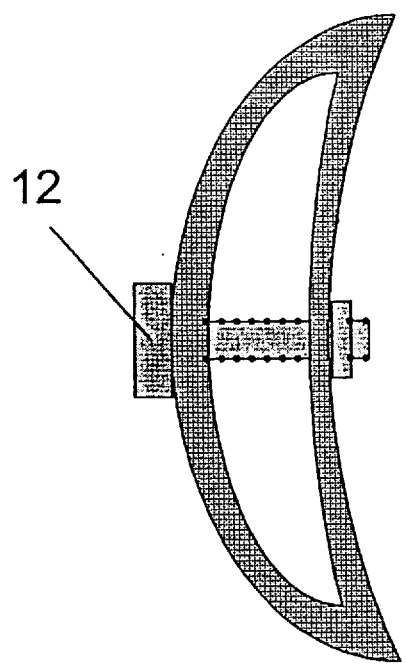
Figure 3:
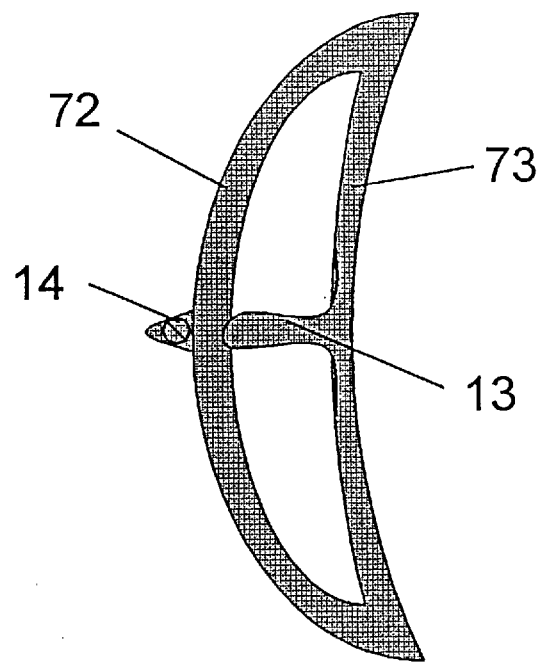
Figure 3:
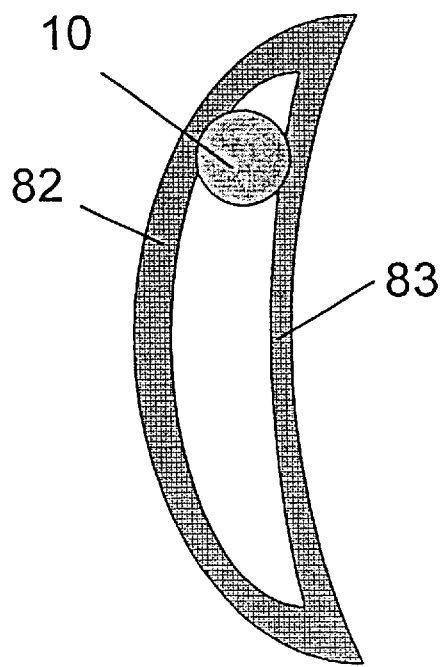
Figure 3:
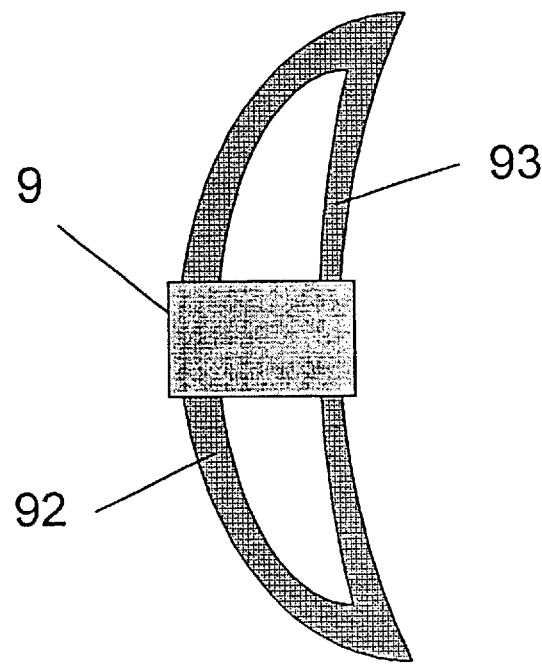

FIGS. 3(a–d) show various possible means of applying transversal forces to the curved longitudinal members. FIG. 3a shows the use of a screw 12. The screw may be provided with a spring. FIG. 3b shows an embodiment of the invention where the 'inner' curved member 73 has a branch 13 that extends through the 'outer' member 72 and allows the application of transversal forces by means of an eccentric screw 14. FIG. 3c shows the means for applying transversal forces to the longitudinal members 82, 83 in the form of a slidable member 10. FIG. 3d shows an embodiment of the invention for which the means for applying transversal forces to the longitudinal members 92, 93 are a ring 9 which is slidable along the longitudinal members.

The slidable member may be implemented as a carriage on a pair of rails, where the rails are made in the sides of the longitudinal parts that oppose each other. Alternatively, the slidable member may be made as a ball, gliding in slits made in the sides of the longitudinal parts that oppose each other. In another embodiment, the slidable member can be made as an outer ring that forces the two longitudinal pieces together at the location of the ring. In yet another embodiment, the slidable member can be made as a combination of an outer ring and an 'inner' ball, etc. or other conventional solution as long as it fulfils its main task of fixing the distance between the longitudinal members. Further, more than one slidable member can be implemented to increase the possible adjustment range.

Figure 4:
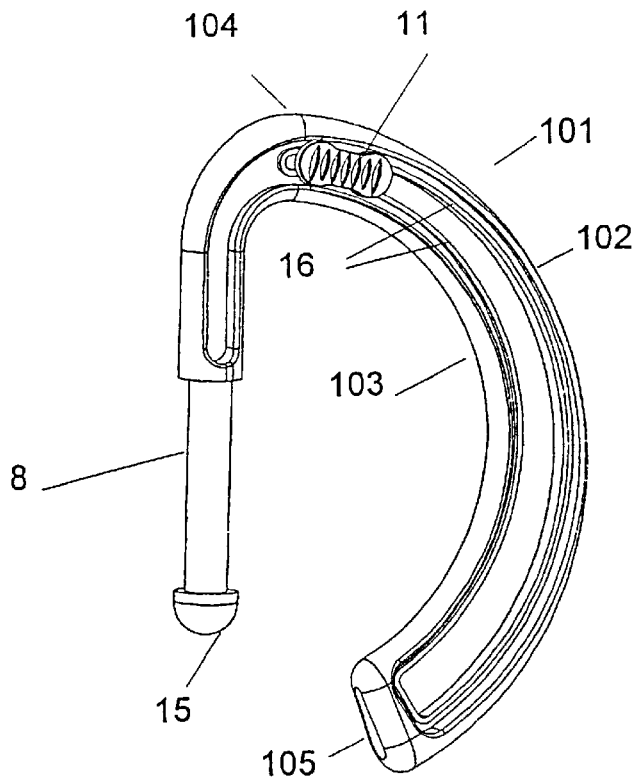
Figure 4:
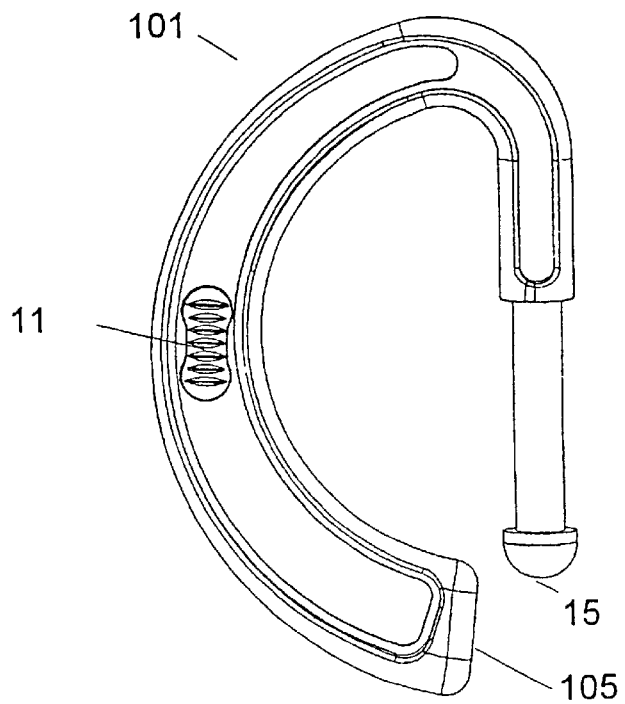

FIGS. 4(a,b) show an earpiece 101 utilizing the merits of the invention. The earpiece 101 consists of a pole-shaped part 8 firmly joined at one end 104 to one end of a curved part whose curvature is adjustable. The adjustable, curved part consists of two longitudinal curved members 102, 103, firmly joined together at both ends 104, 105. The two longitudinal members are joined at an angle to each other at one end 104 and have different individual curvatures, resulting in an increasing distance between them with increasing distance from the 'intersecting' end 104. The curvature of the two longitudinal members may be changed by means of the slidable member 11 that forces the longitudinal members 102, 103 to maintain a fixed distance from each other at the position of the slidable member 11. In other words, the slidable member 11 forces the radii of curvature of the two longitudinal members 102, 103 to come closer to each other at the position of the slidable member 11.

In this context the term 'firmly joined at both ends' is taken to mean that the junctions have a certain amount of stiffness to ensure that the deformation introduced by the slidable member is not simply absorbed in the junction.

The pole-shaped part 8 and the two longitudinal curved members 102, 103 together constitute a clip or brace 101 whose free ends 105, 15 may be brought closer to or further away from each other by moving the slidable member 11 in the appropriate direction. Therefore, in use, the earpiece 101 is placed with its curved part behind the ear and its pole-shaped part 8 in front of the ear, and the piece may be adjusted for optimal amount of squeeze around the ear by means of the slidable member 11.

FIG. 4(a) shows the earpiece 101 in its 'relaxed' position, i.e. in its most open mode. In the present embodiment this occurs when the slidable member 11 is in its one extreme position 104 closest to the pole-shaped part 8. FIG. 4b shows the earpiece 101 in a more closed situation, which, in the present embodiment, occurs when the slidable member 11 is moved towards the 'free' end 105 of the curved part.

One ore more stops may be introduced to prevent the slidable member from reaching one or both of the extreme positions (possibly to avoid a too large strain on the slidable member). The stop may possibly be used to fix the slidable member in its 'optimal position'.

The pole-shaped part 8 and the two longitudinal curved members 102, 103 originally (i.e. as produced) lie in the same plane. The two parts may, however, be twisted out of plane from each other to match the particular curvature of the 'surroundings' in question, with the advantage of a better fit. The original plane symmetry allows identical devices to be adapted for either left or right sides of the head.

For convenient adjustability of the curvature of the earpiece a suitable amount of friction between the slidable member and the longitudinal members of the adjustable part must be present in order for the slidable member on the one hand to be easily moved to change the curvature of the adjustable part and on the other hand not to be too easily moved from its 'adjusted position'. This is achieved in the present embodiment, as shown in FIGS. 4(a,b), by implementing the slidable member as a carriage 11 on a pair of rails 16, where the rails are made in the sides of the longitudinal parts 102, 103 that oppose each other.

In the present embodiment, the earpiece is made of acetal (POM), a plastics material that has appropriate material properties and allows the design freedom to implement the earpiece in relevant forms. However, the use of this particular material is not essential. Other parameters that may influence the choice of material may be cost, elasticity, weight, colour, 'biocompatibility', etc.

This particular embodiment of the invention is intended for supporting a headset consisting of microphone and loudspeaker for handsfree operation of a telephone or the like. The headset may be fixed to the pole-shaped part 8 of the earpiece 101 by any conventional technique, e.g. by a 'click-on' claw.

Actual embodiments can be implemented in many forms, including embodiments that are initially (i.e. in their position of rest) in their most open state, i.e. where the slidable member starting from its one extreme position, when moved towards its other extreme position, will tend to increase the distance between the fixed and adjustable parts of the earpiece, and embodiments that are initially in their most closed state, i.e. where the slidable member starting from its one extreme position, when moved towards its other extreme position, will tend to decrease the distance between the fixed and adjustable parts of the earpiece.

Other use of the basic idea of the invention may be in any application where an easily adjustable clip, tie or strap is needed.

What is claimed is:

1. An adjustable brace which can be adapted to the anatomy of an individual user, comprising:

a pair of resilient elements which are interconnected at the ends, wherein the elements are curved so that one element is predominantly positioned externally in the brace, while the other element is predominantly positioned internally in the brace; and adjusting means configured to cooperate with both elements between their ends to adjust the distance between the elements.

2. A brace according to claim 1, wherein the elements are evenly curved, and wherein the element predominantly positioned externally in the brace generally has a smaller radii of curvature than the element predominantly positioned internally in the brace.

3. A brace according to claim 1 wherein, the elements converge toward one end of the brace.

4. A brace according to claim 1, wherein the elements diverge toward one end of the brace, and wherein the elements are rigidly interconnected via a transverse member.

5. A brace according to claim 1 wherein the brace is configured to conform to the rear side of an ear and comprises a bar adapted to extend forwardly of the ear.

6. A brace according to claim 1, wherein the adjustment means is a ring which surrounds the elements and which is slidable in their longitudinal direction.

7. A brace according to claim 1, wherein the adjustment means is a slide which is slidable along the elements, and which is adapted to cooperate with the elements so that the distance between the elements measured at the slide is defined by the slide.

8. A brace according to claim 1, wherein the adjustment means comprise an adjustment screw.

9. A brace according to claim 6, wherein the adjustment means is fixable.

* * * * *